(12) United States Patent
Kimura et al.

(10) Patent No.: US 11,670,331 B2
(45) Date of Patent: Jun. 6, 2023

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kaori Kimura, Yokohama Kanagawa (JP); Akihiko Takeo, Tokyo (JP); Takuya Matsumoto, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/672,016

(22) Filed: Feb. 15, 2022

(65) Prior Publication Data

US 2023/0074588 A1 Mar. 9, 2023

(30) Foreign Application Priority Data

Sep. 1, 2021 (JP) .............................. JP2021-142663

(51) Int. Cl.
*G11B 5/60* (2006.01)
*G11B 5/127* (2006.01)
*G11B 5/11* (2006.01)
*G11B 5/00* (2006.01)

(52) U.S. Cl.
CPC ............... *G11B 5/607* (2013.01); *G11B 5/11* (2013.01); *G11B 5/1278* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,115,334 A * | 9/2000 | Tsutsui | ................ | G11B 7/0956 369/44.29 |
| 6,369,963 B1 * | 4/2002 | Hotta | ..................... | G11B 7/082 359/813 |
| 8,724,263 B2 * | 5/2014 | Hutchinson | .......... | G11B 5/6005 360/125.74 |
| 8,773,801 B2 | 7/2014 | Kurita et al. | | |
| 8,896,947 B2 | 11/2014 | Koizumi et al. | | |
| 9,355,668 B2 | 5/2016 | Nishida et al. | | |
| 9,460,739 B1 * | 10/2016 | Marchon | .............. | G11B 5/3106 |

(Continued)

FOREIGN PATENT DOCUMENTS

| | | |
|---|---|---|
| JP | 2020-087496 A | 6/2020 |
| JP | 2021-044031 A | 3/2021 |

*Primary Examiner* — Peter Vincent Agustin
(74) *Attorney, Agent, or Firm* — Kim & Stewart LLP (57) ABSTRACT

According to one embodiment, a magnetic disk device includes a rotatable disk-shaped recording medium, a magnetic head including a write head having a main magnetic pole that applies a recording magnetic field to the recording medium, an assist element that assists magnetic recording by the main magnetic pole, and a plurality of thermal actuators that control a head gradient with respect to the recording medium, and a controller which includes a detection unit configured to detect deterioration of the magnetic head, and changes a head gradient of the magnetic head by the thermal actuator according to the detected deterioration.

8 Claims, 8 Drawing Sheets

(56) References Cited

U.S. PATENT DOCUMENTS

| | | | |
|---|---|---|---|
| 9,792,930 B1* | 10/2017 | Shimizu | G11B 5/3133 |
| 10,283,149 B2 | 5/2019 | Lamberts et al. | |
| 10,867,624 B1 | 12/2020 | Watanabe et al. | |
| 11,257,525 B1* | 2/2022 | Rajauria | G11B 27/36 |
| 2003/0026019 A1* | 2/2003 | Smith | G11B 5/58 |
| | | | 360/75 |
| 2003/0035234 A1* | 2/2003 | Coffey | G11B 5/00 |
| | | | 360/59 |
| 2003/0179665 A1* | 9/2003 | Iwazawa | G11B 7/0945 |
| 2005/0036419 A1* | 2/2005 | Lin | G11B 7/0956 |
| | | | 369/53.19 |
| 2008/0007862 A1* | 1/2008 | Hayakawa | G11B 5/5565 |
| 2010/0074064 A1* | 3/2010 | Liu | G11B 7/0956 |
| | | | 369/53.2 |
| 2020/0176020 A1 | 6/2020 | Matsumoto et al. | |
| 2021/0272597 A1* | 9/2021 | Okada | G11B 5/82 |

* cited by examiner

MAGNETIC DISK DEVICE

CROSS-REFERENCE TO RELATED APPLICATIONS

This application is based upon and claims the benefit of priority from Japanese Patent Application No. 2021-142663, filed Sep. 1, 2021, the entire contents of which are incorporated herein by reference.

FIELD

Embodiments described herein relate generally to a magnetic disk device.

BACKGROUND

As a magnetic recording/reading device, for example, a magnetic disk device includes a rotatable disk-shaped recording medium and a magnetic head that records and reads data on and from a magnetic recording layer of the recording medium. The magnetic head includes a slider, and a read head and a recording head provided on the slider. In order to improve recording density, particularly linear recording density, a magnetic head having an assist recording function has been proposed.

In the magnetic head having the assist recording function, a main factor of deterioration of head characteristics is progress of oxidation due to wear of a protective film. This is considered to be caused by wear of the protective film at the time of recording and reading with a reduced flying height of the magnetic head, and further progress of oxidation of the magnetic material due to heat generation by an assist recording operation.

DETAILED DESCRIPTION

Various embodiments will be described hereinafter with reference to the accompanying drawings. In general, according to one embodiment, a magnetic disk device comprises a rotatable disk-shaped recording medium; a magnetic head comprising a write head including a main magnetic pole that applies a recording magnetic field to the recording medium, an assist element that assists magnetic recording by the main magnetic pole, and a plurality of thermal actuators that control a head gradient with respect to the recording medium; and a controller which includes a detection unit configured to detect deterioration of the magnetic head, and changes a head gradient of the magnetic head by the thermal actuator according to the detected deterioration.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

(First Embodiment)

Figure 1:
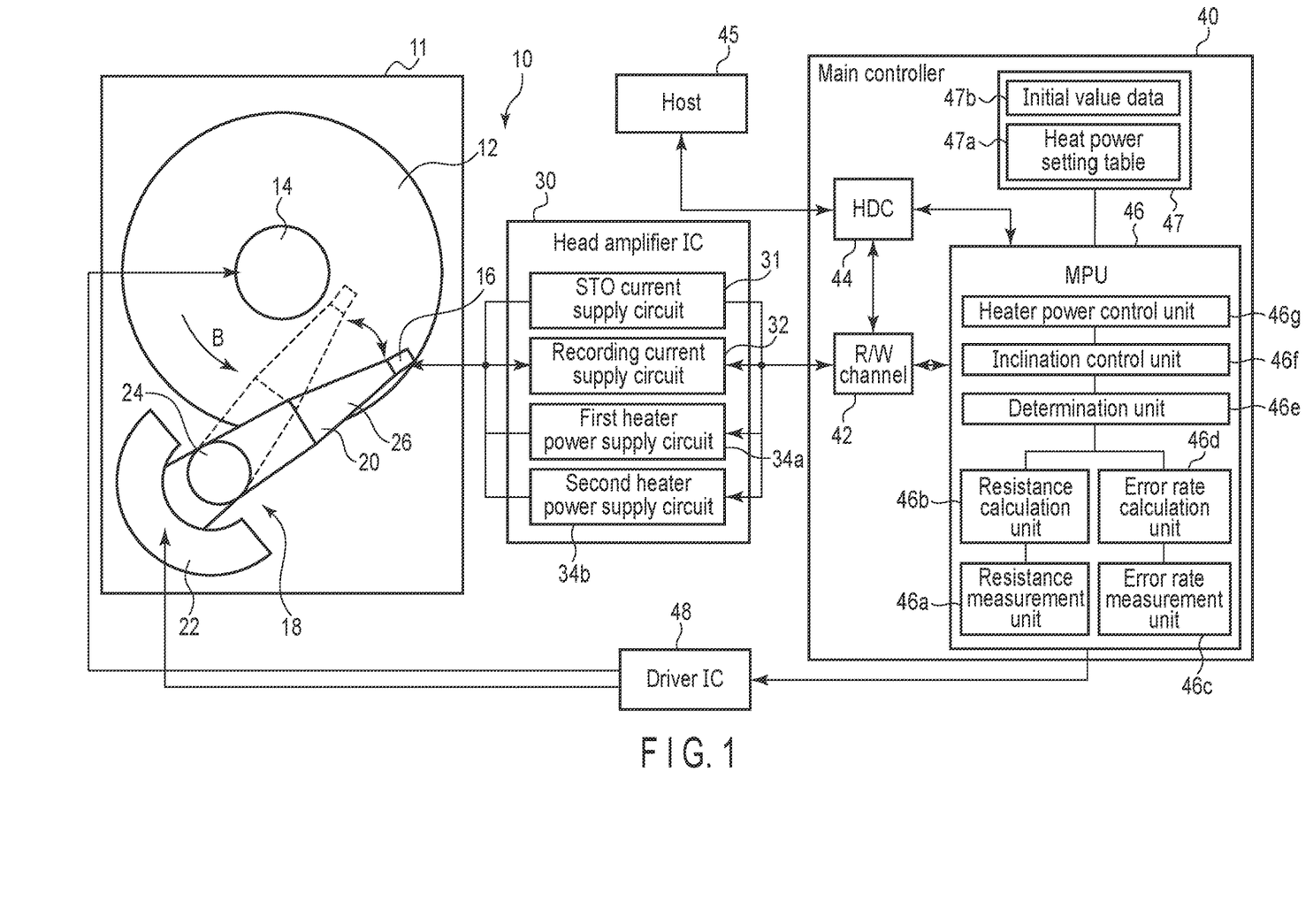
FIG. 1 is a block diagram schematically illustrating a hard disk drive (HDD) according to a first embodiment.
Figure 2:
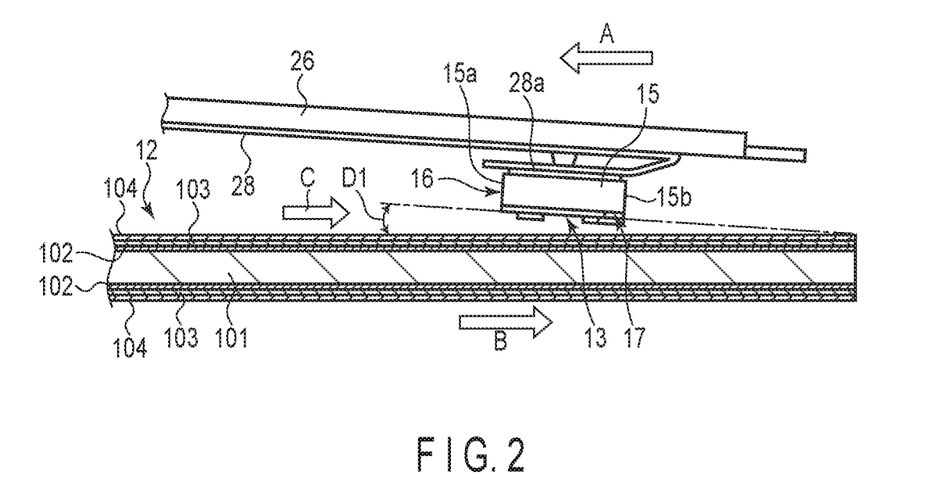
FIG. 2 is a side view schematically illustrating a magnetic head, a suspension, and a magnetic disk in the HDD.

A hard disk drive (HDD) according to a first embodiment will be described in detail as an example of a magnetic disk device. FIG. 1 is a block diagram schematically illustrating the HDD according to the first embodiment, and FIG. 2 is a side view illustrating a magnetic head and a magnetic disk in a flying state.

As illustrated in FIG. 1, the HDD 10 includes a rectangular housing 11, a magnetic disk 12 which is a recording medium disposed in the housing 11, a spindle motor 14 that supports and rotates the magnetic disk 12, and a plurality of magnetic heads 16 that records (writes) and reproduces (reads) data on the magnetic disk 12. The HDD 10 includes a head actuator 18 that moves and positions the magnetic head 16 on an arbitrary track on the magnetic disk 12. The head actuator 18 includes a carriage assembly 20 that movably supports the magnetic head 16, and a voice coil motor (VCM) 22 that rotates the carriage assembly 20.

The HDD 10 includes a head amplifier IC30 that drives the magnetic head 16, a main controller 40, and a driver IC48. The head amplifier IC 30 is provided, for example, in the carriage assembly 20 and is electrically connected to the magnetic head 16. The head amplifier IC 30 includes a recording current supply circuit (recording current supply unit) 32 that supplies a recording current to a recording coil of the magnetic head 16, a spin torque oscillator (STO) current supply circuit 31 that supplies a drive current to a spin torque oscillator (STO) that is a magnetic flux control layer to be described below, a first heater power supply circuit 34a and a second heater power supply circuit 34b that supply drive power to a thermal actuator (heater) of the magnetic head 16 to be described below, an amplifier (not illustrated) that amplifies a signal read by the magnetic head, and the like.

The main controller 40 and the driver IC 48 are configured on, for example, a control circuit board (not illustrated) provided on a rear surface side of the housing 11. The main controller 40 includes an R/W channel 42, a hard disk controller (HDC) 44, a microprocessor (MPU) 46, a memory 47, and the like. The main controller 40 is electrically connected to the magnetic head 16 via the head amplifier IC 30. The main controller 40 is electrically connected to the VCM 22 and the spindle motor 21 via the driver IC 48. The HDC 44 can be connected to a host computer 45.

The R/W channel 42 is a signal processing circuit of read/write data. The HDC 44 configures an interface between the HDD 10 and the host 45, and executes transfer control of read/write data. The memory 47 includes a buffer memory including a DRAM, a flash memory, and the like. The memory 47 stores a heater power setting table 47a to be described below, initial value data 47b including an initial resistance value and an error rate initial value of the STO, and the like.

The MPU 46 is a main control unit of the disk drive, and executes servo control necessary for control of read/write operation and positioning of the magnetic head. Further, the MPU 46 executes energization control of the STO and energization control of the thermal actuator. A detailed configuration of the MPU 46 will be described below.

As illustrated in FIGS. 1 and 2, the magnetic disk 12 is configured as a perpendicular magnetic recording medium. The magnetic disk 12 includes, for example, a substrate 101 formed in a disk shape having a diameter of 96 mm (about 3.5 inches) and made of a non-magnetic material. A soft magnetic layer 102 made of a material exhibiting soft magnetic characteristics as an underlayer, a perpendicular magnetic recording layer 103 having magnetic anisotropy in a direction perpendicular to the surface of the magnetic disk 12, and a protective film 104 are sequentially laminated on each surface of the substrate 101. The magnetic disks 12 are coaxially fitted to the hub of the spindle motor 21. The magnetic disk 12 is rotated in the direction of an arrow B at a predetermined speed by the spindle motor 21.

The carriage assembly 20 includes a bearing portion 24 rotatably supported by the housing 11 and a plurality of suspensions 26 extending from the bearing portion 24. As illustrated in FIG. 2, the magnetic head 16 is supported by the extending end of each suspension 26. The magnetic head 16 is electrically connected to the head amplifier IC 30 via a wiring member (flexure) 28 provided in the carriage assembly 20.

As illustrated in FIG. 2, the magnetic head 16 is configured as a flying head, and includes a slider 15 formed in a substantially rectangular parallelepiped shape, and a head portion 17 formed at an end portion of the slider 15 on an outflow end (trailing) side. The slider 15 is formed of, for example, a sintered body (AlTic) of alumina and titanium carbide, and the head portion 17 is formed of a plurality of thin films. The slider 15 is attached to a gimbal portion 28a of the wiring member 28.

The slider 15 has a substantially rectangular disk facing surface (air bearing surface (ABS)) 13 facing the surface of the magnetic disk 12. The slider 15 is maintained in a state of flying from the surface of the magnetic disk 12 by a predetermined amount by an air flow C generated between the disk surface and the ABS 13 by the rotation of the magnetic disk 12. A direction of the air flow C coincides with a rotation direction B of the magnetic disk 12. The slider 15 has a leading end 15a located on an inflow side of the air flow C and a trailing end 15b located on an outflow side of the air flow C. As the magnetic disk 12 rotates, the magnetic head 16 travels in a direction of an arrow A (head traveling direction) with respect to the magnetic disk 12, that is, in a direction opposite to the rotation direction B of the disk.

In a state where the magnetic head 16 is flying, the ABS 13 of the slider 15 is inclined by a first pitch angle (inclination angle) D1 with respect to the surface of the magnetic disk 12.

Figure 3:
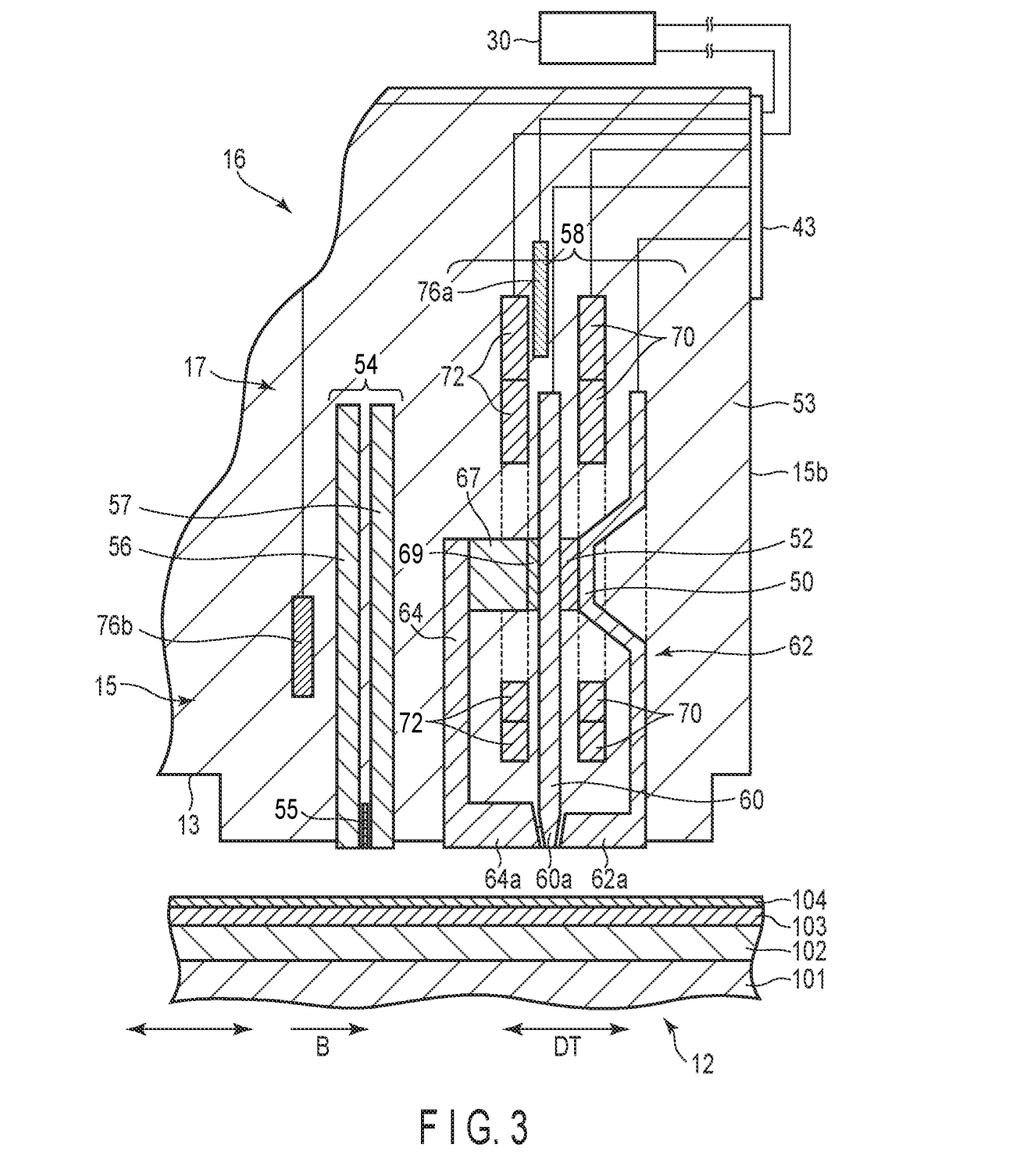
FIG. 3 is an enlarged cross-sectional view illustrating a head portion of the magnetic head.

FIG. 3 is an enlarged cross-sectional view illustrating the head portion 17 of the magnetic head 16 and the magnetic disk 12.

As illustrated in FIG. 3, the head portion 17 includes a read head (reproducing head) 54 and a recording head (write head) 58 formed at the trailing end 15b of the slider 15 by a thin film process, and is formed as a separate type magnetic head. The read head 54 and the recording head 58 are covered with a nonmagnetic protective insulating film 53 except for a portion exposed to the ABS 13 of the slider 15. The protective insulating film 53 constitutes the outer shape of the head portion 17. Furthermore, the head portion 17 includes a first thermal actuator that controls a protruding amount of the recording head 58 and a second thermal actuator that controls a protruding amount of the read head 54. The first thermal actuator includes, for example, a first heater 76a, and the first heater 76a is embedded in the protective insulating film 53 and is located in the vicinity of the recording head 58. The second thermal actuator includes, for example, a second heater 76b provided apart from the first heater 76a, and the second heater 76b is embedded in the protective insulating film 53 and located in the vicinity of the read head 54.

A longitudinal direction of a recording track formed in the perpendicular magnetic recording layer 103 of the magnetic disk 12 is defined as a down track direction DT, and a width direction of the recording track orthogonal to the longitudinal direction is defined as a cross track direction WT.

The read head 54 includes a magnetoresistive effect element 55, and a first magnetic shield film 56 and a second magnetic shield film 57 which are disposed on a leading side (inflow side) and a trailing side (outflow side) of the magnetoresistive effect element 55 so as to sandwich the magnetoresistive effect element 55 in the down track direction DT. The magnetoresistive effect element 55 and the first and second magnetic shield films 56 and 57 extend substantially perpendicular to the ABS 13. Lower end portions (leading end portions) of the magnetoresistive effect element 55 and the first and second magnetic shield films 56 and 57 slightly protrude from the ABS 13.

The recording head 58 is provided on the trailing end 15b side of the slider 15 with respect to the read head 54. The recording head 58 includes a main magnetic pole 60 that generates a recording magnetic field in a direction perpendicular to the surface of the magnetic disk 12, a trailing shield (first shield) 62 provided on the trailing side of the main magnetic pole 60 and facing the main magnetic pole 60 with a write gap, a leading shield (second shield) 64 facing the leading side of the main magnetic pole 60, and a pair of side shields (not illustrated) formed integrally with the trailing shield 62 and provided on both sides of the main magnetic pole 60 in the cross track direction CT. The main magnetic pole 60 and the trailing shield 62 constitute a first magnetic core forming a magnetic path, and the main magnetic pole 60 and the leading shield 64 constitute a second magnetic core forming a magnetic path. The recording head 58 includes a first recording coil 70 wound around the first magnetic core and a second recording coil 72 wound around the second magnetic core.

The main magnetic pole 60 is formed of a soft magnetic material having high magnetic permeability and high saturation magnetic flux density, and extends substantially perpendicular to the ABS 13. A leading end portion 60a of the main magnetic pole 60 on the ABS 13 side is tapered toward the ABS 13, and is formed in a columnar shape having a narrower width than the other portions. The leading end portion 60a of the main magnetic pole 60 slightly protrudes from the ABS 13 of the slider 15.

The trailing shield 62 is formed of a soft magnetic material, and is provided to efficiently close the magnetic path via the soft magnetic layer 102 of the magnetic disk 12 immediately below the main magnetic pole 60. The trailing shield 62 is formed in a substantially L shape, and a leading end portion 62a thereof is formed in an elongated rectangular shape. The leading end portion 62a of the trailing shield 62 slightly protrudes from the ABS 13 of the slider 15.

The leading end portion 62a has a leading side end surface (magnetic pole end surface) 62b facing the leading end portion 60a of the main magnetic pole 60 with a write gap WG. The leading side end surface 62b extends perpendicularly to the ABS 13 or slightly inclined.

The trailing shield 62 has a first connection portion 50 connected to the main magnetic pole 60. The first connection portion 50 is magnetically connected to an upper portion of the main magnetic pole 60, that is, a portion of the main magnetic pole 60 away from the ABS 13 via the nonconductor 52. The first recording coil 70 is wound around the first connection portion 50 in the first magnetic core, for example. When a signal is written to the magnetic disk 12, by causing a recording current to flow in the first recording coil 70, the first recording coil 70 excites the main magnetic pole 60 and causes a magnetic flux to flow in the main magnetic pole 60.

The leading shield 64 made of a soft magnetic material is provided on the leading side of the main magnetic pole 60 so as to face the main magnetic pole 60. The leading shield 64 is formed in a substantially L shape, and a leading end portion 64a on the ABS 13 side is formed in an elongated rectangular shape. The leading end portion 64a slightly protrudes from the ABS 13 of the slider 15. The leading end portion 64a has a trailing side end surface (magnetic pole end surface) 64b facing the leading end portion 60a of the main magnetic pole 60 with a gap.

The leading shield 64 includes a second connection portion 67 joined to the main magnetic pole 60 at a position separated from the ABS 13. The second connection portion 67 is formed of, for example, a soft magnetic material, and is magnetically connected to the upper portion of the main magnetic pole 60, that is, a portion of the main magnetic pole 60 away from the ABS 13 via a non-conductor 59. As a result, the second connection portion 67 forms a magnetic circuit together with the main magnetic pole 60 and the leading shield 64. The second recording coil 72 of the recording head 58 is, for example, wound around the second connection portion 67, and applies a magnetic field to the magnetic circuit.

Figure 4:
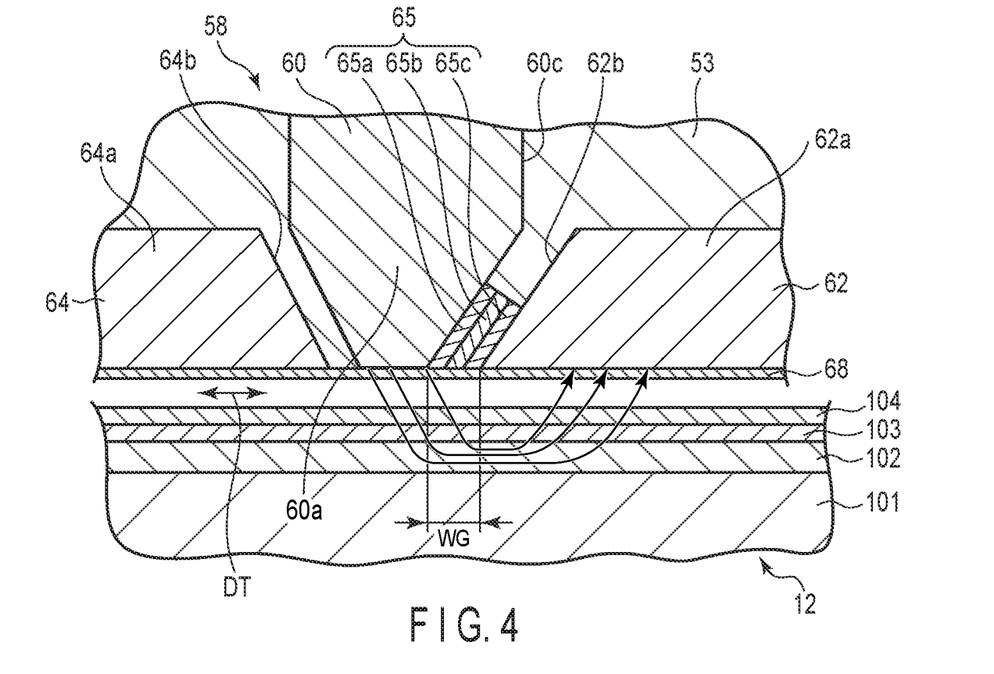
FIG. 4 is an enlarged cross-sectional view illustrating a leading end portion of a recording head.

FIG. 4 is an enlarged cross-sectional view illustrating the leading end portion of the recording head.

As illustrated in FIG. 4, the recording head 58 includes a magnetic flux control layer 65 provided in the write gap WG between the leading end portion 60a of the main magnetic pole 60 and the trailing shield 62. The magnetic flux control layer 65 constitutes a spin torque oscillator (STO) that functions as a high-frequency assist element. In addition, a protective layer 68 that covers an end surface on the ABS 13 side of the recording head 58 including the main magnetic pole 60, the magnetic flux control layer 65, and the trailing shield 62 is provided.

The magnetic flux control layer 65 has a function of suppressing only the inflow of the magnetic flux from the main magnetic pole 60 to the trailing shield 62, that is, oscillating the spin torque so that the magnetic permeability of the write gap WG becomes effectively negative. Specifically, the magnetic flux control layer 65 includes an intermediate layer (first nonmagnetic conductive layer) 65a having conductivity, an adjustment layer 65b, and a conductive cap layer (second nonmagnetic conductive layer) 65c having conductivity, and these layers are sequentially laminated from the main magnetic pole 60 side to the trailing shield 62 side, that is, sequentially laminated along the track direction DT. Each of the intermediate layer 65a, the adjustment layer 65b, and the conductive cap layer 65c has a film surface extending in a direction parallel to the shield side end surface 60c of the main magnetic pole 60, that is, in a direction intersecting the ABS 43.

The stacking direction of the intermediate layer 65a, the adjustment layer 65b, and the conductive cap layer 65c is not limited to the above, and may be stacked in the opposite direction, that is, from the trailing shield 62 side to the main magnetic pole 60 side.

The intermediate layer 65a is, for example, a metal layer such as Cu, Au, Ag, Al, Ir, or a NiAl alloy, and can be formed of a material that does not interfere with spin conduction. The intermediate layer 65a is formed directly on the shield side end surface 60c of the main magnetic pole 60. The adjustment layer 65b includes a magnetic material containing at least one of iron, cobalt, or nickel. As the adjustment layer 65b, for example, an alloy material obtained by adding at least one of Al, Ge, Si, Ga, B, C, Se, Sn, and Ni to FeCo, and at least one material selected from an artificial lattice group consisting of Fe/Co, Fe/Ni, and Co/Ni can be used. A thickness of the adjustment layer 65b can be, for example, 2 to 20 nm. The conductive cap layer 65c may be made of a nonmagnetic metal and a material that blocks spin conduction. The conductive cap layer 65c can be formed of, for example, at least one selected from Ta, Ru, Pt, W, Mo, and Ir, or an alloy containing at least one thereof. The conductive cap layer 65c is formed directly on the leading side end surface 62b of the trailing shield 62. Also, the conductive cap layer can be single or multi-layered.

The intermediate layer 65a is formed to have a film thickness that transmit the spin torque from the main magnetic pole 60 and to sufficiently weaken the exchange interaction, for example, a film thickness of 1 to 5 nm. The conductive cap layer 65c may have a film thickness that blocks the spin torque from the trailing shield 62 and that sufficiently weakens the exchange interaction, for example, a film thickness of 1 nm or more.

Since the magnetization direction of the adjustment layer 65b needs to be opposite to the magnetic field due to the spin torque from the main magnetic pole 60, the saturation magnetic flux density of the adjustment layer 65b is preferably small. On the other hand, in order to effectively shield the magnetic flux by the adjustment layer 65b, the saturation magnetic flux density of the adjustment layer 65b is preferably large. Since the magnetic field between the write gaps WG is about 10 to 15 kOe, the improvement effect is hardly improved even when the saturation magnetic flux density of the adjustment layer 65b is about 1.5T or more. For these reasons, the saturation magnetic flux density of the adjustment layer 65b is desirably 1.5T or less, and more specifically, the product of the film thickness of the adjustment layer 65b and the saturation magnetic flux density is desirably 20 nmT or less.

In order to cause the current to flow in a concentrated manner in a direction perpendicular to the film surfaces of the intermediate layer 65a, the adjustment layer 65b, and the conductive cap layer 65c, the periphery of the magnetic flux control layer 65 is covered with an insulating layer, for example, the protective insulating film 53 except for a portion in contact with the main magnetic pole 60 and the trailing shield 62.

An underlayer can be further provided between the main magnetic pole 60 and the intermediate layer 65a.

As the underlayer, for example, a metal such as Ta or Ru can be used. The thickness of the underlayer can be, for example, 0.5 to 10 nm. Furthermore, the thickness can be about 2 nm.

Further, a cap layer can be further provided between the trailing shield 62 and the conductive cap layer 65c.

As the cap layer, at least one nonmagnetic element selected from the group consisting of Cu, Ru, W, and Ta can be used. The thickness of the cap layer can be, for example, 0.5 to 10 nm. Furthermore, the thickness can be about 2 nm.

In addition, CoFe can be used as the spin polarization layer between the main magnetic pole and the intermediate layer.

The main magnetic pole 60 can be formed of a soft magnetic metal alloy containing a Fe-Co alloy as a main component. The main magnetic pole 60 also has a function as an electrode for applying a current to the intermediate layer 65a. The trailing shield 62 can be formed of a soft magnetic metal alloy containing a Fe-Co alloy as a main component. The trailing shield 62 also has a function as an electrode for applying a current to the conductive cap layer 65c.

The protective layer 68 is provided to protect the ABS 13, is made of one or more materials, and includes a single layer or multiple layers. The protective layer 68 has a surface layer made of, for example, diamond-like carbon. An underlayer made of, for example, Si or the like can be provided between the ABS 13 of the recording head 58 and the protective layer 68.

As illustrated in FIG. 3, the main magnetic pole 60 and the trailing shield 62 are connected to a connection terminal 43 via a wire, and are further connected to the head amplifier IC 30 and the main controller 40 via the wiring member (flexure) 28. A current circuit that energizes an STO drive current (bias voltage) in series from the STO current supply circuit 31 of the head amplifier IC30 through the main magnetic pole 60, the STO 65, and the trailing shield 62 is configured.

Each of the first recording coil 70 and the second recording coil 72 is connected to the connection terminal 43 via a wire, and is further connected to the head amplifier IC30 via the flexure 28. When a signal is written to the magnetic disk 12, a recording current is caused to flow from the recording current supply circuit 32 of the head amplifier IC11 to the recording coils 70 and 72, thereby exciting the main magnetic pole 60 and causing a magnetic flux to flow to the main magnetic pole 60. The recording current supplied to the recording coil 64 is controlled by the HDC 44.

Each of the first heater 76a and the second heater 76b is connected to the connection terminal 43 via a wire, and is further connected to the head amplifier IC30 via the flexure 28. Desired heater power is supplied from the first heater power supply circuit 30a of the head amplifier IC34 to the first heater 76a, and desired heater power is supplied from the second heater power supply circuit 34b to the second heater 76b. Power and a power ratio supplied to the first heater and the second heater are controlled by the MPU 46.

According to the HDD 10 configured as described above, the actuator 18 is rotationally driven by driving the VCM 22, and the magnetic head 16 is moved and positioned on a desired track of the magnetic disk 12. As illustrated in FIG. 2, the magnetic head 16 is flying by an air flow C generated between the disk surface and the ABS 13 by the rotation of the magnetic disk 12. During the operation of the HDD, the ABS 13 of the slider 15 faces the surface of the disk while maintaining a gap and being inclined at a predetermined angle. In this state, the recording information is read from the magnetic disk 1 by the read head 54, and the information is written by the recording head 58.

A protruding amount of the recording head 58, a protruding amount of the read head 54, and an inclination of the magnetic head 16 can be arbitrarily controlled by adjusting the supply power and the power ratio to the first heater 76a and the second heater 76b.

Each of the first heater 76a and the second heater 76b has, for example, a coil shape, and generates heat by being energized to thermally expand the surroundings. As a result, portions in the vicinity of leading ends of the recording head 58 and the read head 54 protrude from the ABS 13 toward the magnetic disk 12 side, the distance from the magnetic disk 12 decreases, and a flying height of the magnetic head 16 decreases. As described above, when the drive current supplied to each of the first heater 76a and the second heater 76 is adjusted to control the amount of heat generation, the flying height of the magnetic head 16 can be controlled. Furthermore, the inclination angle (head gradient) D1 of the magnetic head 16 with respect to the surface of the magnetic disk 12 can be adjusted by adjusting the energization ratio (power ratio) to the first heater 76a and the second heater 76b. For example, in a case where the energization ratio to the first heater 76a is lowered, the protruding amount of the recording head 58 is reduced, and the flying height of the magnetic head 16 increases. As a result, the inclination angle D1 of the magnetic head 16 decreases.

In the initial state of the HDD, power is supplied to the first heater 76a and the second heater 76b at a predetermined power ratio set in advance. As a result, the magnetic head 16 is inclined at a predetermined angle (head gradient) with respect to the magnetic disk 12.

In writing data by the magnetic head 16, as illustrated in FIGS. 3 and 4, under the control of the MPU 46 and the R/W channel 42, the main magnetic pole 60 is excited by supplying a recording current from the recording current supply circuit 32 to the first recording coil 70 and the second recording coil 72, and a recording magnetic field in a vertical direction is applied from the main magnetic pole 60 to the magnetic recording layer 103 of the magnetic disk 12 immediately below. As a result, information is written in the magnetic recording layer 103 with a desired track width.

When a recording magnetic field is applied to the magnetic disk 12, a drive current flows from the STO current supply circuit 31 through the main magnetic pole 60, the STO 65, and the trailing shield 62, and a drive current is applied to the STO 65. By the current application, a spin torque acts on the adjustment layer 65b of the STO 65 from the main magnetic pole 60, and the magnetization direction of the adjustment layer 65b is directed in a direction opposite to the direction of the magnetic field (gap magnetic field) generated between the main magnetic pole 60 and the trailing shield 62. Due to this magnetization reversal, the adjustment layer 65b acts to shield the magnetic flux (gap magnetic field) flowing directly from the main magnetic pole 60 to the trailing shield 62. As a result, the magnetic field leaking from the main magnetic pole 60 to the write gap WG is reduced, and a convergence of the magnetic flux from the leading end portion 60a of the main magnetic pole 60 toward the magnetic recording layer 103 of the magnetic disk 12 is improved. That is, the magnetic flux flowing out from the main magnetic pole 60 to the trailing shield 62 can be directed to the magnetic disk (recording medium) 16 while keeping the write gap WG narrow. As a result, resolution of the recording magnetic field is improved, and a recording linear density can increase. Note that, although the mode in which the magnetization of the STO 65 is reversed by the action of the spin torque is exemplified above, a mode in which the magnetization of the STO 65 is simultaneously rotated may be included. By applying the high-frequency magnetic field generated by the simultaneous rotation to the magnetic recording layer 103, it is possible to increase the recording linear density.

Figure 5:
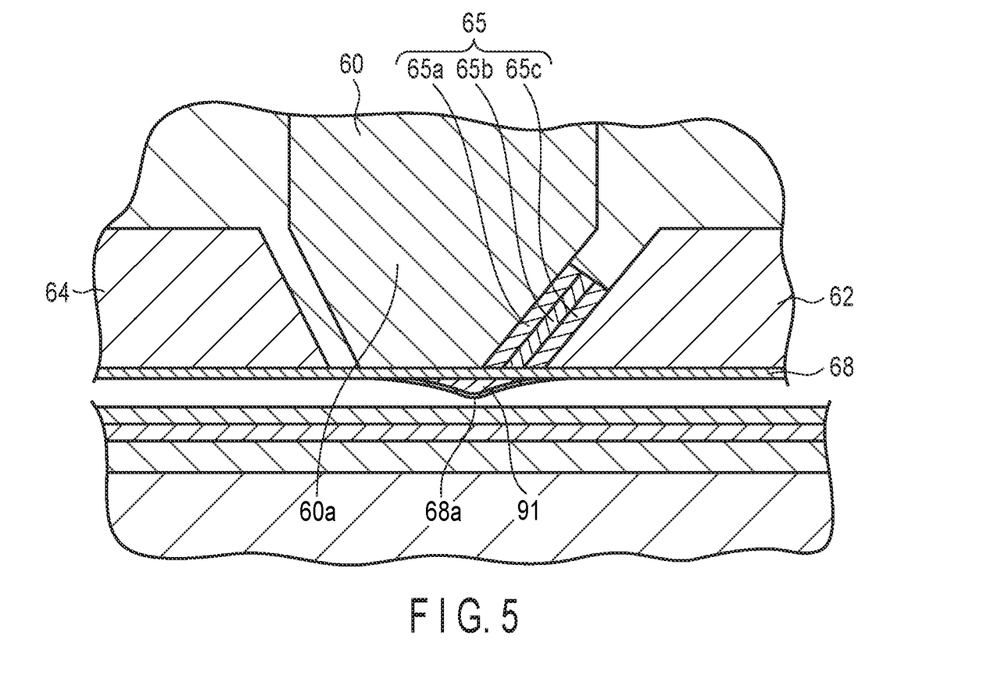
FIG. 5 is an enlarged cross-sectional view illustrating the leading end portion of the recording head.

On the other hand, the magnetic flux control layer (STO) 65 generates heat when energized. As a result, the magnetic material of the magnetic flux control layer 65 is oxidized, the oxide precipitates, and the ABS 13 and the protective layer 68 near the magnetic flux control layer 65 are deformed. FIG. 5 is a cross-sectional view schematically illustrating a magnetic head in which the ABS 13 and the protective layer 68 are deformed. As illustrated in FIG. 5, in the leading end portion of the recording head 58, the iron oxide layer 91 precipitated in the protective layer 68 due to oxidation of the magnetic element contained in the magnetic flux control layer 65, for example, iron pushes up and deforms the surface region 68a of the protective layer 68.

As described above, in the HDD according to the present embodiment, an assist effect of increasing the recording magnetic field is obtained by energizing the magnetic flux control layer 65, but an oxide of a magnetic element of the magnetic flux control layer 65 is precipitated near the ABS, and the ABS 13 and the protective layer 68 are deformed. As a result, the distance between the magnetic disk and the leading end portion of the recording head 58 is shortened, the recording head 58 is more likely to come into contact with the magnetic disk and be damaged, and the protective layer 68 is more likely to be worn. In addition, the precipitation of the oxide increases the conduction resistance of the magnetic flux control layer 65.

Therefore, the HDD 10 according to the present embodiment is configured to suppress the deterioration of the magnetic head by controlling the inclination (head gradient) of the magnetic head, particularly the flying height of the recording head, according to the deterioration of the magnetic head 16, for example, according to the decrease in the bit error rate of the magnetic head or the increase in the resistance value of the magnetic flux control layer 65. Hereinafter, an operation of controlling the inclination of the magnetic head will be described.

As illustrated in FIG. 3, the MPU 46 of the main controller 40 includes: a resistance measurement unit 46a that measures the resistance value of the magnetic flux control layer (STO) 65; a first calculation unit 46b that calculates, as a resistance value change rate, a percentage of the measured resistance value with respect to the initial resistance value of the STO 65 measured at the initial use stage of the magnetic head 16 and stored in the memory 47 as initial value data 47b; an error rate measurement unit 46c that measures a bit error rate of data written by the magnetic head 16; a second calculation unit 46d that calculates a change amount of the measured bit error rate with respect to the initial value of the bit error rate stored in the memory 47 as initial value data 47b; a determination unit 46e that determines a recording inclination of the magnetic head 16 corresponding to the resistance value change rate and the error rate change amount; an inclination control unit 46f that controls the flying height of the magnetic head and the flying height of the recording head 58 according to recording inclination information; and a heater power control unit 46g that adjusts the power ratio to be supplied to the first and second thermal actuators based on the heater power setting table 47a stored in the memory 47 under the control of the inclination control unit 46f. In the heater power setting table 47a, data in which the relationship between the inclination of the magnetic head (flying height of the recording head 58) and the power ratio is tabulated is recorded.

Figure 6:
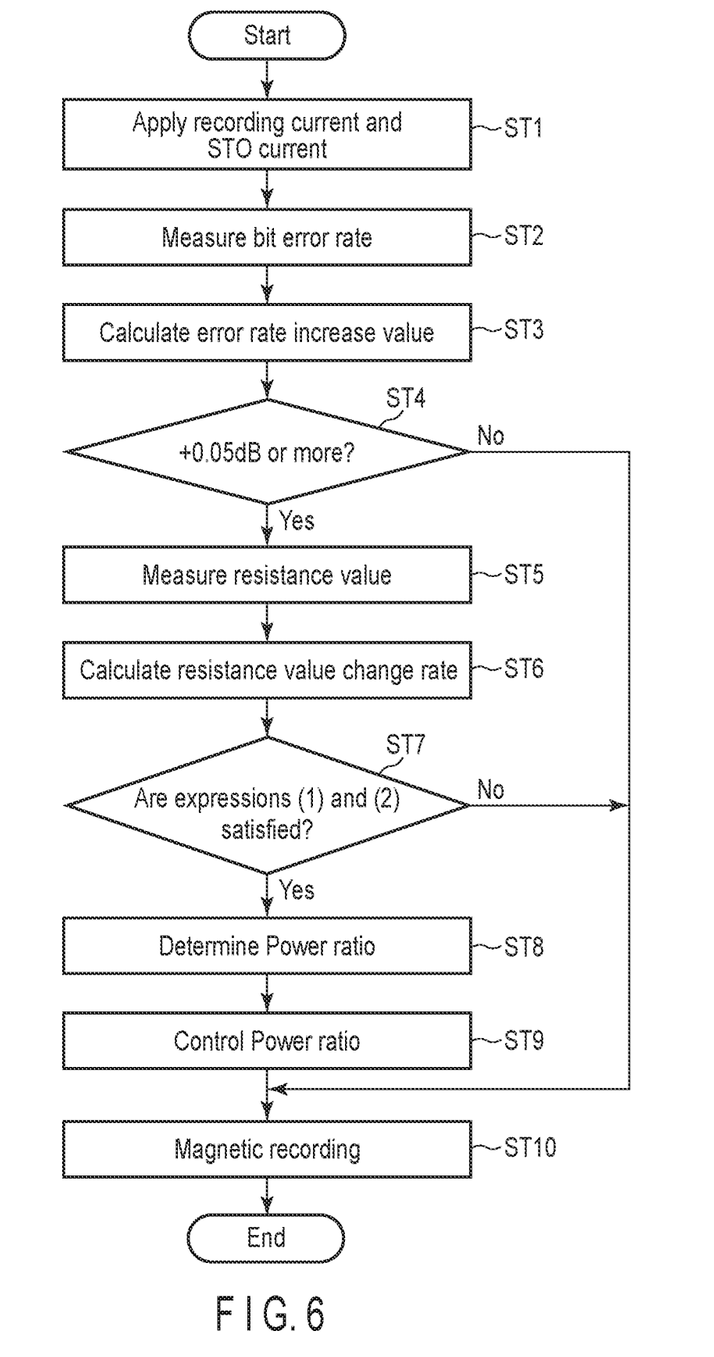
FIG. 6 is a flowchart illustrating a deterioration suppression processing operation of the magnetic head at the time of magnetic recording.

FIG. 6 is a flowchart illustrating a processing operation for controlling the inclination of the magnetic head 16 by the main controller 40.

As illustrated in FIGS. 1 and 6, the main controller 40 applies predetermined recording current and STO current to the magnetic head 16 before performing the recording operation (ST1). Next, the error rate measurement unit 46c measures the bit error rate of the magnetic head 16 (ST2). The error rate calculation unit 46d acquires the bit error rate at the initial use of the magnetic head stored in the memory 47, and calculates an increase value of the measured bit error rate with respect to the initial bit error rate (ST3). The determination unit 46e determines whether the increase value of the bit error rate is a predetermined value, for example, +0.05 dB or more (ST4).

When the increase value is +0.05 dB or more, the resistance measurement unit 46a measures the resistance value of the magnetic flux control layer (STO) 65 (ST5). The resistance calculation unit 46b acquires the initial resistance value of the magnetic flux control layer 65 at the initial use of the magnetic head stored in the initial value data 47b of the memory 47, and calculates the resistance value change rate as the ratio of the measured resistance value to the initial resistance value (ST6).

The determination unit 46e determines whether or not the bit error rate increase value and the resistance value change rate satisfy any of the following relational expressions (1) and (2) (ST7).

Resistance value change rate ≤2%; Bit error rate increase value >0.05 . . . (1)

Resistance value change ratio >2%; Bit error rate increase value >(resistance value change rate −2)×0.033 . . . (2)

When it is satisfied, that is, when the bit error rate increase value reaches the predetermined increase value before the resistance value change rate reaches the predetermined change rate, the determination unit 46f determines that deterioration of the recording head has occurred. As a result, the determination unit 46f calculates the inclination (head gradient or flying height of the recording head) of the magnetic head 16 that does not collide with the magnetic disk 12. In the present embodiment, the inclination of the magnetic head is calculated so that the main magnetic pole 60 of the recording head 58 does not become the lowest point (the point closest to the surface of the magnetic disk) of the ABS Further, the determination unit 46e determines the heater power ratio (power ratio) corresponding to the calculated slope based on the heater power setting table 47a stored in the memory 47

The heater power control unit 46g controls the power ratio of the power supplied to the first heater 76a and the second heater 76b according to the power ratio information from the determination unit 46f (ST9). After adjusting the inclination of the magnetic head 16, the recording head 58 of the magnetic head 16 performs desired magnetic recording (ST10).

In a case where the increase value of the bit error rate is smaller than the predetermined value in the processing step (ST4) described above, and in a case where none of the relational expressions (1) and (2) is satisfied in the processing step (ST7), the MPU 46 determines that the deterioration of the recording head 58 has not progressed, and executes desired magnetic recording by the recording head 58.

The above-described deterioration detection and deterioration suppression processing of the magnetic head are performed for each magnetic recording of the recording head 58.

According to the HDD 10 according to the first embodiment configured as described above, the deterioration state of the magnetic head is detected for each magnetic recording operation, and in a case where the magnetic head is deteriorated, the head gradient of the magnetic head and the flying height of the recording head are changed to suppress further deterioration of the magnetic head. As a result, it is possible to provide a magnetic disk device that can suppress deterioration of the magnetic head and has improved reliability.

Next, a magnetic head of an HDD according to another embodiment will be described. In other embodiments described below, the same parts as those of the first embodiment described above are denoted by the same reference numerals as those of the first embodiment, and a detailed description thereof may be omitted or simplified.

(Second Embodiment)

Figure 7:
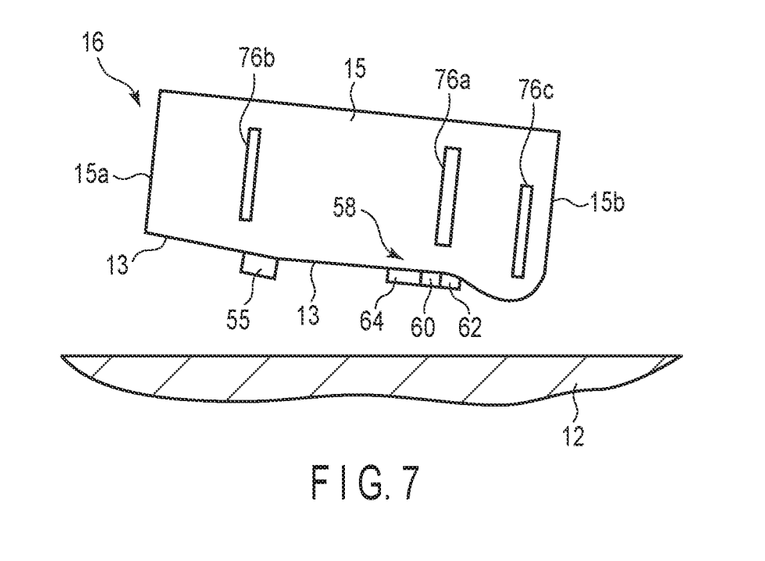
FIG. 7 is a side view schematically illustrating a magnetic head of an HDD according to a second embodiment.

FIG. 7 is a side view schematically illustrating a magnetic head of an HDD according to a second embodiment.

As illustrated in FIG. 7, according to the second embodiment, a magnetic head 16 includes a third heater (third thermal actuator) 76*c* as a thermal actuator in addition to a first heater 76*a* and a second heater 76*b*. The third heater 76*c* is provided on a side opposite to the second heater 76*b* with respect to the first heater 76*a*. The third heater 76*c* is provided outside the first heater 76*a*, that is, on a trailing end 15*b* side in a slider 15.

When detecting the deterioration of the magnetic head 16, a main controller 40 applies power to the third heater 76*c* to increase a protruding amount of a portion on a trailing end side of a main magnetic pole 60. As a result, it is possible to change a head gradient of the magnetic head 16, create a new lowest point on the trailing end side of the main magnetic pole 60, and protect the main magnetic pole 60, that is, to prevent contact between the main magnetic pole 60 and the magnetic disk 12. The main controller 40 calculates and adjusts the heater power so that the flying height (=the height difference from the main magnetic pole) at the lowest point does not exceed 0.8 nm.

(Third Embodiment)

Figure 8:
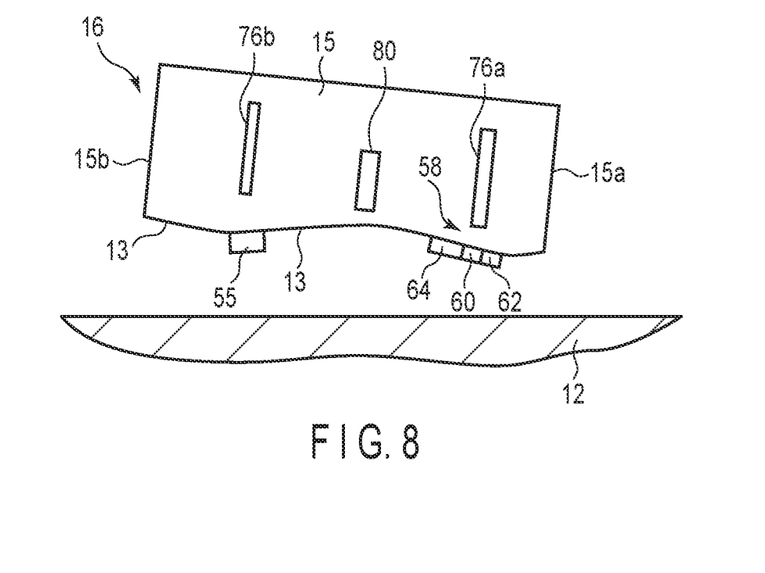
FIG. 8 is a side view schematically illustrating a magnetic head of an HDD according to a third embodiment.

FIG. 8 is a side view schematically illustrating a magnetic head of an HDD according to a third embodiment.

As illustrated in FIG. 8, according to the third embodiment, a magnetic head 16 includes a cooling element (a Peltier element, a thermal electron emission cooling substrate, or the like) 80 provided between a first heater 76*a* and a second heater 76*b* as a thermal actuator. When detecting deterioration of a recording head 58, a main controller 40 supplies electric power to the cooling element 80, and cools a region between a recording head 58 and a read head 55 by the cooling element 80. The cooled region is pulled up in a direction away from a magnetic disk 12. As a result, a main magnetic pole 60 can be pulled up, and the lowest point of an ABS 13 can be shifted toward a trailing shield 62. That is, a head gradient of the magnetic head 16 can be changed to prevent contact between the main magnetic pole 60 and the magnetic disk 12.

(Fourth Embodiment)

Figure 9:
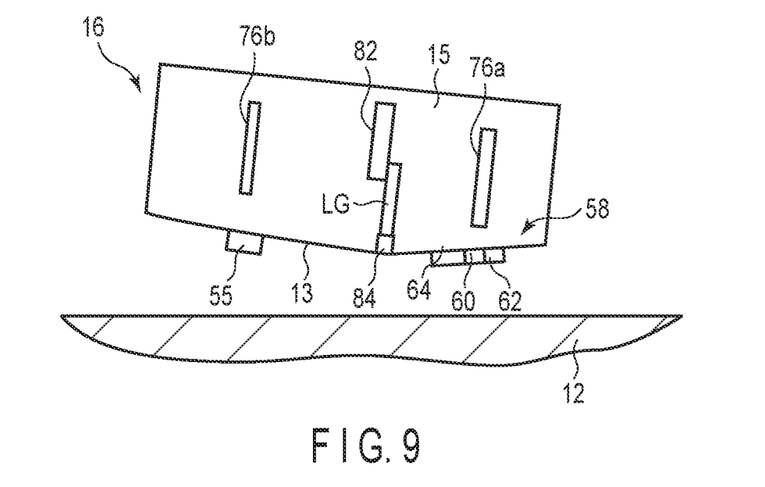
FIG. 9 is a side view schematically illustrating a magnetic head of an HDD according to a fourth embodiment.

FIG. 9 is a side view schematically illustrating a magnetic head of an HDD according to a fourth embodiment.

As illustrated in FIG. 9, according to the fourth embodiment, a magnetic head 16 uses a heat assist element having a heat assist function as the assist element. The magnetic head 16 includes a laser oscillator (laser diode) 82 embedded in the head portion, a near-field light generation element (NFT element) 84 embedded in the head portion and exposed to an ABS 13 on a leading side of a main magnetic pole 60, and a waveguide LG embedded in the head portion and guiding the laser light emitted from the laser diode 82 to the NFT element 84. The laser diode 82 is electrically connected to a laser drive current supply circuit of a head amplifier IC 30 via wires and flexures (not illustrated).

A resistance measurement unit 40*a* of a main controller 46 described above is electrically connected to the near-field light generation element 84 and can measure the resistance value of the near-field light generation element 84. In addition, a STO current supply circuit 31 of the head amplifier IC 30 is replaced with a laser drive current supply circuit that supplies a drive current to the laser diode 82.

Other configurations of the magnetic head 16 are similar to those of the magnetic head 16 according to the first embodiment described above.

When a driving current is supplied from the laser driving current supply circuit of the head amplifier IC 30 to the laser diode 82, the laser diode 82 oscillates laser light, supplies the laser light to the NFT element 84 via a waveguide LG, and generates near-field light from the NFT element 84. The generated near-field light is applied to a magnetic disk 12 as heat energy, and locally heats a magnetic recording layer 103 to reduce the coercive force of the recording layer portion. A recording magnetic field from a main magnetic pole 60 is applied to a coercive force decrease region, and a signal is written. As described above, the magnetic recording layer 103 portion is locally heated, and a signal is written in a region where the coercive force is sufficiently reduced, whereby high-density recording can be performed.

In the fourth embodiment, any one of the first embodiment, the second embodiment, and the third embodiment described above can be applied to the control of the head gradient when the magnetic head 16 is deteriorated.

(Fifth Embodiment)

Figure 10:
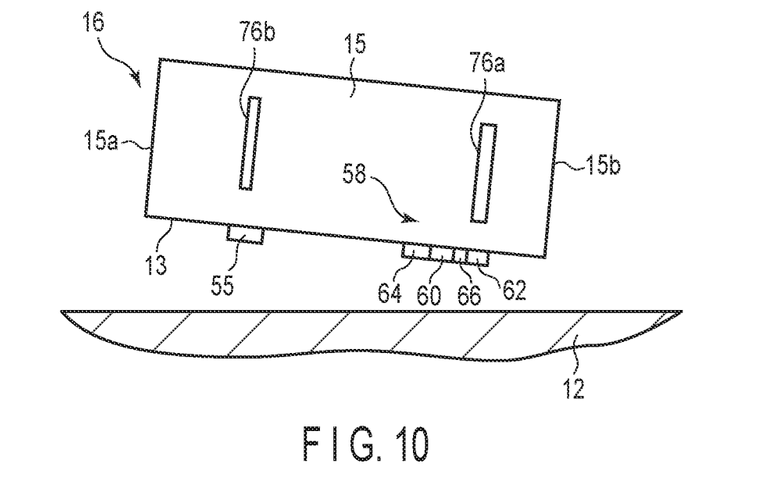
FIG. 10 is a side view schematically illustrating a magnetic head of an HDD according to a fifth embodiment.
Figure 11:
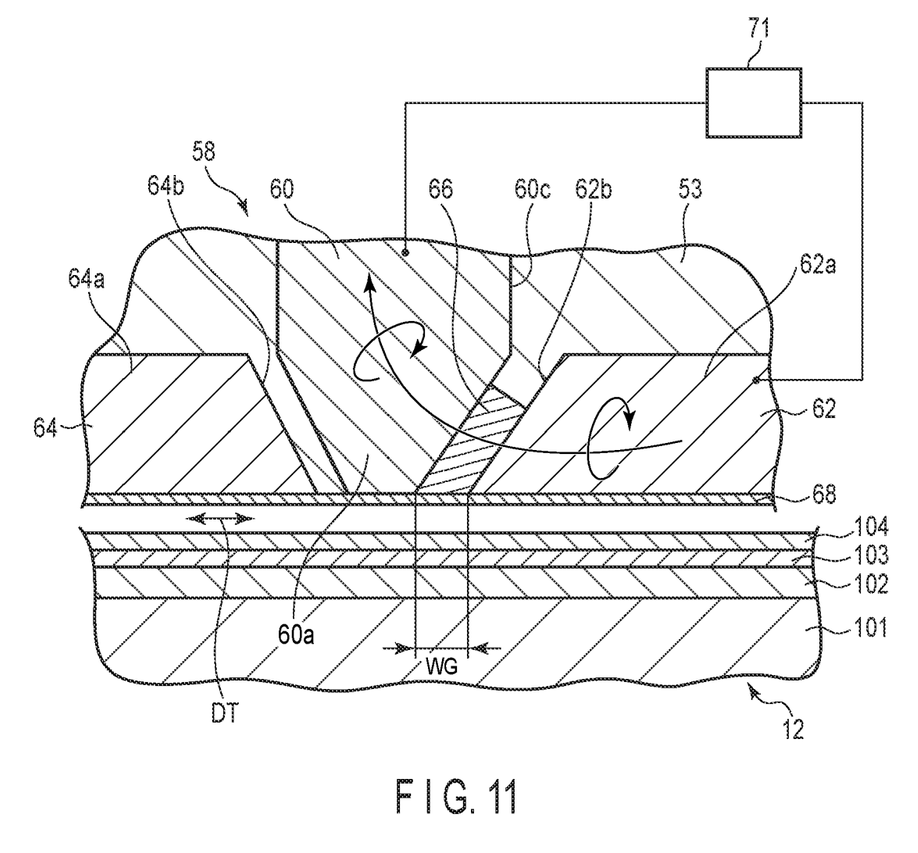
FIG. 11 is an enlarged cross-sectional view illustrating a leading end portion of a recording head in the fifth embodiment.

FIG. 10 is a side view schematically illustrating a magnetic head of an HDD according to a fifth embodiment, and FIG. 11 is an enlarged cross-sectional view illustrating a leading end portion of a recording head in the fifth embodiment.

As illustrated in FIG. 10, according to the fifth embodiment, a magnetic head 16 uses an energy assist element as an assist element. As illustrated in FIG. 11, a recording head 58 includes a nonmagnetic conductor 66 provided in a write gap WG between a leading end portion 60*a* of a main magnetic pole 60 and a trailing shield 62. The nonmagnetic conductor 66 is, for example, a single-layer nonmagnetic conductive layer formed of Cu, and is provided in a write gap WG in a state where one surface abuts on a shield side end surface 60*c* of a main magnetic pole 60 and the other surface abuts on a leading end surface 62*b* of the trailing shield 62. A leading end surface of the nonmagnetic conductor 66 is exposed to an ABS 13.

The main magnetic pole 60 and the trailing shield 62 are electrically connected to a current supply circuit 71 via a wire. In one example, the current supply circuit 71 is provided in a head amplifier IC 30 instead of a STO current supply circuit 31. From the current supply circuit 71, current can be conducted in series through the trailing shield 62, the nonmagnetic conductor 66, and the main magnetic pole 60. The current may be conducted in the opposite direction, that is, through the main magnetic pole 60, the nonmagnetic conductor 66, and the trailing shield 62.

When a direct current is passed through the nonmagnetic conductor 66 in a state where a recording magnetic field is applied to the main magnetic pole 60, a circular magnetic field in a direction crossing a flow direction of the current is generated. Due to the generated circular magnetic field, a magnetic field component in the transverse direction is generated in the magnetic flux of the recording magnetic field, and switching of the magnetization of the main magnetic pole 60 is assisted. That is, since the magnetization switching can be accelerated and the jitter can be reduced, it is possible to contribute to the improvement of the magnetic recording density.

In the fifth embodiment, other configurations of the magnetic head 16 are similar to those of the magnetic head 16 according to the first embodiment described above. In the fifth embodiment, any one of the first embodiment, the second embodiment, and the third embodiment described above can be applied to the control of the head gradient when the magnetic head 16 is deteriorated.

Next, Examples of the HDD will be described.

(Example 1)

The magnetic head 16 used in the first embodiment was produced as follows.

First, a first conductive layer, an adjustment layer, and a second conductive layer having the following materials and thicknesses were laminated in this order on a main magnetic pole mainly made of FeCo using a DC magnetron sputtering method to obtain a magnetic flux control layer 65. As materials of the first conductive layer, the adjustment layer, and the second conductive layer, the same materials as those of the intermediate layer 65a, the adjustment layer 65b, and the conductive cap layer 65c illustrated in FIG. 4 were used.

A mask layer for defining the size of the magnetic flux control layer 65 in the stripe height direction was formed, and then the magnetic flux control layer was etched by an ion beam etching (IBE) method until the main magnetic poles were exposed. SiOx as an insulating film was formed on the peripheral portion of the magnetic flux control layer 65, and then the mask layer was removed. In addition, the magnetic flux control layer was processed by forming a mask layer for defining the size of the magnetic flux control layer 65 in the track width direction, etching similarly, and forming SiOx as an insulating film in a peripheral portion of the magnetic flux control layer 65. Next, NiFe was formed as a trailing shield on the conductive cap layer 65c.

Thereafter, a Si underlayer of about 1 nm was formed on the main magnetic pole on the ABS side, the magnetic flux control layer, the trailing shield, and the insulating film by sputtering, and then diamond-like carbon was formed on the Si underlayer by a CVD method to form a protective layer having a thickness of 1.6 nm, thereby obtaining a magnetic head. Similarly, a total of 200 magnetic heads having a 1.6 nm protective layer on the ABS side were prepared. The prepared magnetic head was installed to prepare an HDD.

As a long-term energization test, the obtained HDD was energized to the magnetic flux control layer 65 for 5000 hours at an applied voltage of 300 mV at an environmental temperature of 80° C. The resistance values of the magnetic flux control layer 65 before the energization test and after the energization test were measured by the main controller of the HDD and compared. Among the 200 magnetic heads, inclination control was not executed even when bit error rate deterioration was found for 100 magnetic heads, and inclination control similar to that in the first embodiment was executed for the remaining 100 magnetic heads. As a result, there were a plurality of magnetic heads in which the bit error rate was deteriorated at the point of the lapse of 5000 hours with respect to the bit error rate value before the energization test.

The bit error rate value was determined as OK/NG with a cut-off value of −1.7 dB, and the number was counted, and the results in Table 1 below were obtained. In the HDD without the inclination control, 35 magnetic heads out of 100 magnetic heads had BER and NG, whereas in the HDD that executes the inclination control, only 5 magnetic heads out of 10 magnetic heads had BER and NG. From this result, it can be said that in the HDD with inclination control, the bit error rate (BER) and the number of NGs were significantly suppressed, and deterioration of the main magnetic pole was suppressed.

TABLE 1

| Inclination Control | BER NG |
| --- | --- |
| Present | 5/100 |
| Not Present | 35/100 |

(Example 2)

The magnetic head 16 used in the fourth embodiment was manufactured in the same manner as in Example 1. However, the near-field light waveguide LG was made of $Al_2O_3$ or $Ta_2O_5$ having a high refractive index and was connected to the laser diode 82 provided in the light source unit adjacent to the main magnetic pole 60. Instead of the magnetic flux control layer, a plasmon generation element was formed on the leading side of the main magnetic pole 60 and connected to the waveguide LG. Further, a heat sink layer made of Cu was formed in the vicinity of the main magnetic pole, and a magnetic head having a heat assist function was formed. As the magnetic recording medium, a medium made of a high Hk material containing FePt as a main component was used.

50 magnetic heads described above were prepared, and 25 magnetic heads were used each, and evaluation was performed under the same conditions as in Example 1. However, the evaluation environmental temperature was room temperature, and the evaluation time was 2000 hours. The evaluation results are illustrated in Table 2 below. Also in Example 2, it can be said that in the HDD with inclination control, the bit error rate (BER) and the number of NGs were significantly suppressed, and deterioration of the main magnetic pole was suppressed.

TABLE 2

| Inclination Control | BER NG |
| --- | --- |
| Present | 5/25 |
| Not Present | 10/25 |

(Example 3)

The magnetic head used in the fifth embodiment was produced in the same manner as in Example 1.

However, instead of the magnetic flux control layer, Cu as a nonmagnetic conductor was embedded between the main magnetic pole and the trailing shield with the same film thickness. In the magnetic head using the nonmagnetic conductor, a magnetic field due to a current is generated instead of reversal and rotation of magnetization by the magnetic flux control layer, and switching of magnetization of the head is assisted. 200 of these heads were prepared, and 100 heads each were used, and evaluation was performed under the same conditions as in Example 1. However, the evaluation environmental temperature was 70° C., and the evaluation time was 5000 hours. The evaluation results are illustrated in Table 3 below. When the inclination control is performed, the same effect of suppressing BER and NG as in the first and second embodiments can be seen also in the energy assist head by the current.

TABLE 3

| Inclination Control | BER NG |
|---|---|
| Present | 22/100 |
| Not Present | 40/100 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The recording head of the magnetic head according to the embodiments can also be applied to a recording head having no leading shield and/or side shield. Materials, shapes, sizes, and the like of elements constituting the head portion of the magnetic head can be changed as necessary. In the magnetic disk device, the number of magnetic disks and the number of magnetic heads can be increased or decreased as necessary, and the size of the magnetic disk can be variously selected.

What is claimed is:

1. A magnetic disk device comprising:
a rotatable disk-shaped recording medium;
a magnetic head comprising a write head including a main magnetic pole that applies a recording magnetic field to the recording medium, an assist element that assists magnetic recording by the main magnetic pole, and a plurality of thermal actuators that control a head gradient with respect to the recording medium; and
a controller which includes a detection unit configured to detect deterioration of the magnetic head, and changes a head gradient of the magnetic head by the thermal actuator so that a distance between the main magnetic pole and the recording medium increases when deterioration of the magnetic head is detected;
wherein the detection unit includes a resistance measurement unit that measures a resistance value of the assist element, and
the controller is configured to detect occurrence of deterioration in the vicinity of the main magnetic pole and change the head gradient when the measured bit error rate exceeds the predetermined value before the measured resistance value of the assist element exceeds a predetermined value.

2. The magnetic disk device of claim 1,
wherein the detection unit includes an error rate measurement unit that measures a bit error rate of the write head, and the controller is configured to change the head gradient in a case where the measured bit error rate exceeds a predetermined value.

3. The magnetic disk device of claim 1,
wherein the assist element includes a spin torque oscillator provided adjacent to the main magnetic pole.

4. The magnetic disk device of claim 1,
wherein the assist element includes an energy assist element made of a nonmagnetic conductor provided in contact with the main magnetic pole.

5. The magnetic disk device of claim 1,
wherein the assist element includes a heat assist element that applies heat energy to the recording medium.

6. A magnetic disk device comprising:
a rotatable disk-shaped recording medium;
a magnetic head comprising a write head including a main magnetic pole that applies a recording magnetic field to the recording medium, an assist element that assists magnetic recording by the main magnetic pole, and a plurality of thermal actuators that control a head gradient with respect to the recording medium; and
a controller which includes a detection unit configured to detect deterioration of the magnetic head, and changes a head gradient of the magnetic head by the thermal actuator according to the detected deterioration;
wherein the plurality of thermal actuators includes a first heater that controls a protruding amount of protrusion of the write head, and a second heater provided apart from the first heater, and
the controller is configured to control the head gradient by adjusting a power ratio of power supplied to the first heater and the second heater when deterioration of the magnetic head is detected.

7. A magnetic disk device comprising:
a rotatable disk-shaped recording medium;
a magnetic head comprising a write head including a main magnetic pole that applies a recording magnetic field to the recording medium, an assist element that assists magnetic recording by the main magnetic pole, and a plurality of thermal actuators that control a head gradient with respect to the recording medium; and
a controller which includes a detection unit configured to detect deterioration of the magnetic head, and changes a head gradient of the magnetic head by the thermal actuator according to the detected deterioration;
wherein the plurality of thermal actuators include a first heater that controls a protruding amount of the write head, a second heater provided apart from the first heater, and a third heater provided on a side opposite to the second heater with respect to the first heater, and the controller is configured to supply power to the third heater and control the head gradient when detecting deterioration of the magnetic head.

8. A magnetic disk device comprising:
a rotatable disk-shaped recording medium;
a magnetic head comprising a write head including a main magnetic pole that applies a recording magnetic field to the recording medium, an assist element that assists magnetic recording by the main magnetic pole, and a plurality of thermal actuators that control a head gradient with respect to the recording medium; and
a controller which includes a detection unit configured to detect deterioration of the magnetic head, and changes a head gradient of the magnetic head by the thermal actuator according to the detected deterioration;
wherein the plurality of thermal actuators include a first heater that controls a protruding amount of the write head, a second heater provided apart from the first heater, and a cooling element provided in the vicinity of the main magnetic pole between the first heater and the second heater, and the controller is configured to control the head gradient by cooling a peripheral portion by the cooling element according to deterioration detected by the detection unit and pulling up the peripheral portion in a direction away from the recording medium.

\* \* \* \* \*